United States Patent
Bippert et al.

(10) Patent No.: US 11,048,237 B2
(45) Date of Patent: Jun. 29, 2021

(54) SYSTEM FOR OPTIMIZING DRINK BLENDS

(71) Applicant: The Coca-Cola Company, Atlanta, GA (US)

(72) Inventors: Douglas A. Bippert, Marietta, GA (US); Sherri Lynn Hutter, Decatur, GA (US); Timothy A. Anglea, Windermere, FL (US); Jon A. Higbie, Jr., Tyrone, GA (US); David Quinton Cross, Atlanta, GA (US); Seonah Lee, Atlanta, GA (US); Sean Patrick Lennon, Smyrna, GA (US)

(73) Assignee: The Coca-Cola Company, Atlanta, GA (US)

(*) Notice: Subject to any disclaimer, the term of this patent is extended or adjusted under 35 U.S.C. 154(b) by 80 days.

(21) Appl. No.: 16/386,059

(22) Filed: Apr. 16, 2019

(65) Prior Publication Data

US 2019/0346831 A1   Nov. 14, 2019

Related U.S. Application Data

(63) Continuation of application No. 14/148,513, filed on Jan. 6, 2014, now Pat. No. 10,261,501, which is a
(Continued)

(51) Int. Cl.
*G05B 19/41* (2006.01)
*G06Q 10/06* (2012.01)
(Continued)

(52) U.S. Cl.
CPC .......... *G05B 19/418* (2013.01); *G06Q 10/06* (2013.01); *G06Q 30/02* (2013.01); *G06Q 30/0202* (2013.01); *G06Q 30/0206* (2013.01)

(58) Field of Classification Search
None
See application file for complete search history.

(56) References Cited

U.S. PATENT DOCUMENTS

| 4,278,695 A | 7/1981 | Velasco |
| 5,058,768 A | 10/1991 | Lichfield |

(Continued)

FOREIGN PATENT DOCUMENTS

| EP | 1287458 A2 | 3/2003 |
| JP | 2005057814 A | 3/2005 |

(Continued)

OTHER PUBLICATIONS

Meyer et. al., "Optimizing Sweetener Blends for Low-Calorie Beverages", Jul. 2002, Food Magazine. (Year: 2002).*

(Continued)

*Primary Examiner* — Mohammad Ali
*Assistant Examiner* — Kelvin Booker
(74) *Attorney, Agent, or Firm* — Foley & Lardner LLP

(57) ABSTRACT

A system for optimizing blending. The system can include a processor configured to aggregate material information, aggregate production information, model consumer liking of the at least one product, and provide plan information for controlling production resources based on the material information, the production information, and the consumer liking. The material information can be associated with a product input of the at least one product. The production information can be associated with the production resources of the at least one product.

19 Claims, 8 Drawing Sheets

Related U.S. Application Data continuation of application No. 12/940,173, filed on Nov. 5, 2010, now Pat. No. 8,626,327, and a continuation of application No. 12/940,182, filed on Nov. 5, 2010, now abandoned, and a continuation of application No. 12/940,222, filed on Nov. 5, 2010, now Pat. No. 8,626,564, and a continuation of application No. 12/940,205, filed on Nov. 5, 2010, now abandoned, and a continuation of application No. 12/940,195, filed on Nov. 5, 2010, now abandoned.

(51) Int. Cl.
  *G06Q 30/02* (2012.01)
  *G05B 19/418* (2006.01)

(56) References Cited

U.S. PATENT DOCUMENTS

| | | |
|---|---|---|
| 5,350,082 A | 9/1994 | Kiriakides, Jr. et al. |
| 5,369,570 A | 11/1994 | Parad |
| 5,388,725 A | 2/1995 | Lichfield |
| 5,412,564 A | 5/1995 | Ecer |
| 5,450,317 A | 9/1995 | Lu et al. |
| 5,575,405 A | 11/1996 | Stratton et al. |
| 5,600,134 A | 2/1997 | Ashe et al. |
| 5,699,259 A | 12/1997 | Colman et al. |
| 5,765,143 A | 6/1998 | Sheldon et al. |
| 5,946,662 A | 8/1999 | Ettl et al. |
| 5,971,587 A | 10/1999 | Kato et al. |
| 6,049,742 A | 4/2000 | Milne et al. |
| 6,151,582 A | 11/2000 | Huang et al. |
| 6,383,546 B1 | 5/2002 | Powrie et al. |
| 6,425,862 B1 | 7/2002 | Brown |
| 6,560,501 B1 | 5/2003 | Walser et al. |
| 6,611,735 B1 | 8/2003 | Henly et al. |
| 6,731,998 B2 | 5/2004 | Walser et al. |
| 6,742,552 B2 | 6/2004 | Raniwala |
| 6,836,689 B2 | 12/2004 | Walser et al. |
| 6,917,843 B2 | 7/2005 | Yeh et al. |
| 6,947,905 B1 | 9/2005 | Starr et al. |
| 7,024,265 B2 | 4/2006 | Walser et al. |
| 7,058,587 B1 | 6/2006 | Horne |
| 7,085,730 B1 | 8/2006 | Tsao et al. |
| 7,107,113 B1 | 9/2006 | Morenz et al. |
| 7,110,956 B1 | 9/2006 | Drake, Jr. et al. |
| 7,115,297 B2 | 10/2006 | Stillman |
| 7,130,712 B1 | 10/2006 | Ghosh et al. |
| 7,251,611 B2 | 7/2007 | Abbott et al. |
| 7,292,904 B2 | 11/2007 | Denton et al. |
| 7,379,905 B2 | 5/2008 | Beebe et al. |
| 7,395,228 B2 | 7/2008 | Seaman et al. |
| 7,444,295 B2 | 10/2008 | Peachey-Kountz |
| 7,493,184 B2 | 2/2009 | Geroulo |
| 7,536,341 B2 | 5/2009 | Ouden |
| 7,590,937 B2 | 9/2009 | Jacobus |
| 7,644,863 B2 | 1/2010 | Chen et al. |
| 7,660,730 B2 | 2/2010 | Hosoda et al. |
| 7,668,761 B2 | 2/2010 | Jenkins et al. |
| 7,684,892 B2 | 3/2010 | Yuan et al. |
| 7,716,077 B1 | 5/2010 | Mikurak |
| 7,747,339 B2 | 6/2010 | Jacobus et al. |
| 7,904,192 B2 | 3/2011 | Chua et al. |
| 7,908,127 B2 | 3/2011 | Weigang et al. |
| 7,921,030 B1 | 4/2011 | Verma et al. |
| 8,047,401 B2 | 11/2011 | Holler |
| 8,087,303 B2 | 1/2012 | Beavis |
| 8,175,913 B2 | 5/2012 | Checketts et al. |
| 8,249,946 B2 | 8/2012 | Froseth et al. |
| 8,255,265 B2 | 8/2012 | Warier et al. |
| 8,322,570 B2 | 12/2012 | Beavis et al. |
| 8,626,327 B2 * | 1/2014 | Bippert .......... G06Q 10/06 700/100 |
| 8,626,564 B2 * | 1/2014 | Bippert .......... G06Q 30/0201 705/7.31 |
| 2001/0002269 A1 | 5/2001 | Zhao |
| 2001/0006176 A1 | 7/2001 | Haselden, Jr. |
| 2001/0046545 A1 | 11/2001 | Jones |
| 2001/0053404 A1 | 12/2001 | Powrie et al. |
| 2002/0004749 A1 | 1/2002 | Forseth et al. |
| 2002/0040302 A1 | 4/2002 | Gau et al. |
| 2002/0072988 A1 | 6/2002 | Aram |
| 2002/0122866 A1 | 9/2002 | Palanaippan et al. |
| 2002/0138324 A1 | 9/2002 | Zarefoss et al. |
| 2002/0143608 A1 | 10/2002 | Brown |
| 2002/0169695 A1 | 11/2002 | Ko et al. |
| 2002/0178077 A1 | 11/2002 | Katz et al. |
| 2003/0018516 A1 | 1/2003 | Ayala et al. |
| 2003/0033180 A1 * | 2/2003 | Shekar .......... G06Q 10/06375 705/7.37 |
| 2003/0036946 A1 | 2/2003 | Lin et al. |
| 2003/0061108 A1 | 3/2003 | Tu et al. |
| 2003/0083963 A1 | 5/2003 | Benson |
| 2003/0101179 A1 | 5/2003 | Lee et al. |
| 2003/0167098 A1 | 9/2003 | Walser et al. |
| 2003/0208392 A1 | 11/2003 | Shekar et al. |
| 2003/0228393 A1 | 12/2003 | Zhao |
| 2003/0229550 A1 | 12/2003 | DiPrima et al. |
| 2003/0233262 A1 | 12/2003 | Chorely et al. |
| 2004/0039650 A1 | 2/2004 | Lentz |
| 2004/0049415 A1 | 3/2004 | Liou et al. |
| 2004/0098155 A1 | 5/2004 | Walser et al. |
| 2004/0126474 A1 | 7/2004 | LeTourneau et al. |
| 2004/0128176 A1 | 7/2004 | Jordan et al. |
| 2004/0172321 A1 | 9/2004 | Vemula et al. |
| 2004/0260513 A1 | 12/2004 | Fitzpatrick et al. |
| 2005/0008734 A1 | 1/2005 | Westphal et al. |
| 2005/0049920 A1 | 3/2005 | Day et al. |
| 2005/0075891 A1 | 4/2005 | Arguimbau, III |
| 2005/0075900 A1 | 4/2005 | Arguimbau, III |
| 2005/0123650 A1 | 6/2005 | Parente et al. |
| 2005/0149377 A1 | 7/2005 | Schierholt |
| 2005/0160005 A1 | 7/2005 | Roth et al. |
| 2005/0211768 A1 | 9/2005 | Stillman |
| 2005/0214433 A1 | 9/2005 | Hardesty et al. |
| 2005/0246223 A1 | 11/2005 | Roth et al. |
| 2005/0247213 A1 | 11/2005 | Slilaty |
| 2005/0256760 A1 | 11/2005 | Siddhanti |
| 2006/0064344 A1 | 3/2006 | Lidow |
| 2006/0173728 A1 | 8/2006 | An et al. |
| 2006/0190362 A1 | 8/2006 | Krystek et al. |
| 2006/0218057 A1 | 9/2006 | Fitzpatrick et al. |
| 2006/0231574 A1 | 10/2006 | Bilskie et al. |
| 2006/0265293 A1 | 11/2006 | Bengyak |
| 2007/0005185 A1 | 1/2007 | Roth et al. |
| 2007/0009576 A1 | 1/2007 | Stillman |
| 2007/0014909 A1 | 1/2007 | Mai et al. |
| 2007/0061220 A1 | 3/2007 | Vaid |
| 2007/0067213 A1 | 3/2007 | Brown |
| 2007/0073557 A1 | 3/2007 | Abramson |
| 2007/0083413 A1 | 4/2007 | Srinivasan et al. |
| 2007/0136126 A1 | 6/2007 | Notani et al. |
| 2007/0168240 A1 | 7/2007 | Alfandary et al. |
| 2007/0179652 A1 | 8/2007 | Weigang et al. |
| 2007/0192213 A1 | 8/2007 | Wu et al. |
| 2007/0294129 A1 | 12/2007 | Froseth et al. |
| 2008/0004973 A1 | 1/2008 | Rothschild |
| 2008/0077507 A1 | 3/2008 | McElhiney et al. |
| 2008/0095906 A1 | 4/2008 | Zheng et al. |
| 2008/0133589 A1 | 6/2008 | Nickerson et al. |
| 2008/0156124 A1 | 7/2008 | O'Connor et al. |
| 2008/0177593 A1 | 7/2008 | Clayton et al. |
| 2008/0201241 A1 | 8/2008 | Pecoraro |
| 2008/0215410 A1 | 9/2008 | Cheng et al. |
| 2008/0228797 A1 | 9/2008 | Kenedy et al. |
| 2009/0037299 A1 | 2/2009 | Powell et al. |
| 2009/0055247 A1 | 2/2009 | Jackson |
| 2009/0063251 A1 * | 3/2009 | Rangarajan .......... G06Q 30/02 705/7.31 |
| 2009/0069933 A1 | 3/2009 | Rudick et al. |
| 2009/0069949 A1 * | 3/2009 | Carpenter .......... B67D 1/0021 700/283 |
| 2009/0083123 A1 | 3/2009 | Powell et al. |
| 2009/0087539 A1 | 4/2009 | Fry et al. |

(56) References Cited

U.S. PATENT DOCUMENTS

| | | |
|---|---|---|
| 2009/0089027 A1 | 4/2009 | Sturrock et al. |
| 2009/0089031 A1 | 4/2009 | Sturrock et al. |
| 2009/0089032 A1 | 4/2009 | Sturrock et al. |
| 2009/0089227 A1 | 4/2009 | Sturrock et al. |
| 2009/0125350 A1 | 5/2009 | Lessing et al. |
| 2009/0136632 A1 | 5/2009 | Gutwein et al. |
| 2009/0159612 A1 | 6/2009 | Beavis et al. |
| 2009/0164262 A1 | 6/2009 | Ettl et al. |
| 2009/0202676 A1 | 8/2009 | Colliver et al. |
| 2009/0216613 A1 | 8/2009 | Steinbach et al. |
| 2009/0277516 A1 | 11/2009 | Winkler et al. |
| 2009/0292573 A1 | 11/2009 | Gupta et al. |
| 2009/0299779 A1 | 12/2009 | Ettl et al. |
| 2009/0313090 A1 | 12/2009 | Armstrong et al. |
| 2009/0327039 A1 | 12/2009 | Cox et al. |
| 2010/0005903 A1 | 1/2010 | Beavis |
| 2010/0040317 A1 | 2/2010 | Kellam |
| 2010/0063869 A1 | 3/2010 | Kriss |
| 2010/0082497 A1 | 4/2010 | Biesemann et al. |
| 2010/0088142 A1 | 4/2010 | El-Bakry et al. |
| 2010/0124592 A1 | 5/2010 | Anderson |
| 2010/0125486 A1 | 5/2010 | Sinclair et al. |
| 2010/0125487 A1 | 5/2010 | Sinclair et al. |
| 2010/0138276 A1 | 6/2010 | Bildmayer et al. |
| 2010/0179863 A1 | 7/2010 | Agrawal et al. |
| 2010/0205044 A1 | 8/2010 | Scheer |
| 2010/0206400 A2 | 8/2010 | Winkler et al. |
| 2010/0274377 A1 | 10/2010 | Kaufman et al. |
| 2010/0274612 A1 | 10/2010 | Walker et al. |
| 2010/0280895 A1 | 11/2010 | Mottola |
| 2010/0316768 A1 | 12/2010 | Stillman |
| 2011/0011888 A2 | 1/2011 | Beavis et al. |
| 2011/0015277 A1 | 1/2011 | Thielen et al. |
| 2011/0022225 A1 | 1/2011 | Rothschild |
| 2011/0027423 A1 | 2/2011 | Ellis |
| 2011/0071883 A1 | 3/2011 | Warier et al. |
| 2011/0177225 A1 | 7/2011 | Matsubayashi et al. |
| 2011/0217417 A1 | 9/2011 | Perlman |
| 2011/0293782 A1 | 12/2011 | Katzir et al. |
| 2011/0318717 A1 | 12/2011 | Adamowicz |
| 2012/0114814 A1 | 5/2012 | Bippert |
| 2012/0116563 A1* | 5/2012 | Bippert .............. G06Q 30/0202 700/99 |
| 2012/0116565 A1* | 5/2012 | Bippert .................. G06Q 10/06 700/103 |
| 2012/0116783 A1* | 5/2012 | Bippert .................. G06Q 30/02 705/1.1 |
| 2012/0116841 A1* | 5/2012 | Bippert .................. G06Q 10/06 705/7.31 |
| 2012/0116842 A1* | 5/2012 | Bippert .............. G06Q 30/0202 705/7.31 |
| 2012/0192969 A1 | 8/2012 | Beavis et al. |
| 2012/0221393 A1 | 8/2012 | Ouimet et al. |
| 2012/0239523 A1 | 9/2012 | Ouimet et al. |
| 2012/0298532 A1 | 11/2012 | Woolf et al. |

FOREIGN PATENT DOCUMENTS

| | | |
|---|---|---|
| JP | 2001266048 A | 9/2008 |
| WO | 2005062771 A2 | 7/2005 |
| WO | 2007002680 A2 | 1/2007 |
| WO | 2008075936 A1 | 6/2008 |

OTHER PUBLICATIONS

Franklin Djeumou Fomeni, "A multi-objective optimization approach for the blending problem in the tea industry", Sep. 2017, International Journal of Production Economics 205 (2018) 179-192. (Year: 2017).*

Thakur et al., "A multi-objective optimization approach to balancing cost and traceability in bulk grain handling", Feb. 2010, Journal of Food Engineering 101 (2010) 193-200. (Year: 2010).*

Gabriel et al., "Quality of Orange Juice Drink Subjected to a Predictive Model-Based Pasteurization Process", Journal of Food Quality, vol. 32, Iss. 4, pp. 452-468, Aug. 2009 (Aug. 2009) <url:http://onlinelibrary.wiley.com/doi/10.1111/j.1745-4557.2009.00260.x/abstract>.

Osofisan,"Fuzzy Logic Control of the Syrup Mixing Process in Beverage Production", 2007, AcademicDirect, Leonardo Journal of Sciences 6(11):93-108.

Bates et al., "Principles and Practices of Small- and Medium Scale Fruit Juice Processing", FAO Agriculture Services Bulletin 146, 2001.

APV, "Mixing and Blending Technology", 2009, SPX Corporation.

* cited by examiner

SYSTEM FOR OPTIMIZING DRINK BLENDS

RELATED APPLICATIONS

This application is a continuation of and claims priority under 35 U.S.C. § 120 to U.S. patent application Ser. No. 14/148,513 entitled "System For Optimizing Drink Blends", filed Jan. 6, 2014, issued as U.S. Pat. No. 10,261,501 on Apr. 16, 2019, which is a continuation of U.S. patent application Ser. No. 12/940,173 entitled "System for Optimizing Drink Blends," filed Nov. 5, 2010, which issued as U.S. Pat. No. 8,626,327 on Jan. 7, 2014, U.S. patent application Ser. No. 12/940,182 entitled "System for Modeling Drink Supply and Demand," filed Nov. 5, 2010, which is now abandoned, U.S. patent application Ser. No. 12/940,205 entitled "Total Quality Management System for Optimizing Drink Process," filed Nov. 5, 2010, which is now abandoned, U.S. patent application Ser. No. 12/940,222, entitled "Drink Production Process Simulator," filed Nov. 5, 2010, issued as U.S. Pat. No. 8,626,564 on Jan. 7, 2014, and U.S. patent application Ser. No. 12/940,195 entitled "System for Targeting Promotions Based on Input and Production," filed Nov. 5, 2010, which is now abandoned; the disclosures of all the above listed applications are incorporated herein by reference for all purposes.

BACKGROUND

The following description is provided to assist the understanding of the reader. None of the information provided or references cited is admitted to be prior art.

Developing a production plan for fruit-based drinks presents unique challenges for a business unit manager. The input material for fruit-based drinks, for example, fruit, can be highly variable in available quantity, cost, and quality. For example, available quantity, cost, and quality of fruit can depend on hurricane activity or if an early freeze occurs. Thus, the supply of available fruit for drinks can be highly variable across multiple dimensions.

Consumer demand for fruit-based drinks can depend on quality and cost. For example, consumers might buy more of a fruit-based drink when the drink composition is sweeter. However, the available quantity of sweet fruit may be limited. Thus, the business unit manager, faced with a limited quantity of sweet fruit, must develop a production plan that balances the available fruit with the perceived consumer demand.

The business unit manager has limited information and must rely primarily on intuition to develop a production plan. An intuitive approach can result in inconsistent results over time as well as across regions. Further, when a business unit manager leaves or moves to a different position, the institutional knowledge and experience of that person is lost. Therefore, improved systems and methods for developing and implementing production plans for fruit-based drinks are needed.

SUMMARY

One illustrative embodiment relates to a system for optimizing blending. The system can include a processor configured to aggregate material information, aggregate production information, model consumer liking of at least one product, and provide plan information for controlling production resources based on the material information, the production information, and the consumer liking. The material information can be associated with a product input of the at least one product. The production information can be associated with production resources of the at least one product.

Another illustrative embodiment relates to a method of optimizing blending. Material information can be aggregated at a processor. The material information can be associated with a product input of at least one product. Production information can be aggregated. The production information can be associated with production resources of the at least one product. Consumer liking of the at least one product can be modeled. Plan information for controlling the production resources can be provided based on the material information, the production information, and the consumer liking.

Another illustrative embodiment relates to an article of manufacture including a tangible computer-readable medium having instructions stored thereon that, if executed by a computing device, cause the computing device to perform operations. The operations can include aggregating material information, aggregating production information of the at least one product, modeling consumer liking of at least one product, and providing plan information for controlling the production resources based on the material information, the production information, and the consumer liking. The material information can be associated with a product input of the at least one product. The production information can be associated with production resources of the at least one product.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

Figure 1:
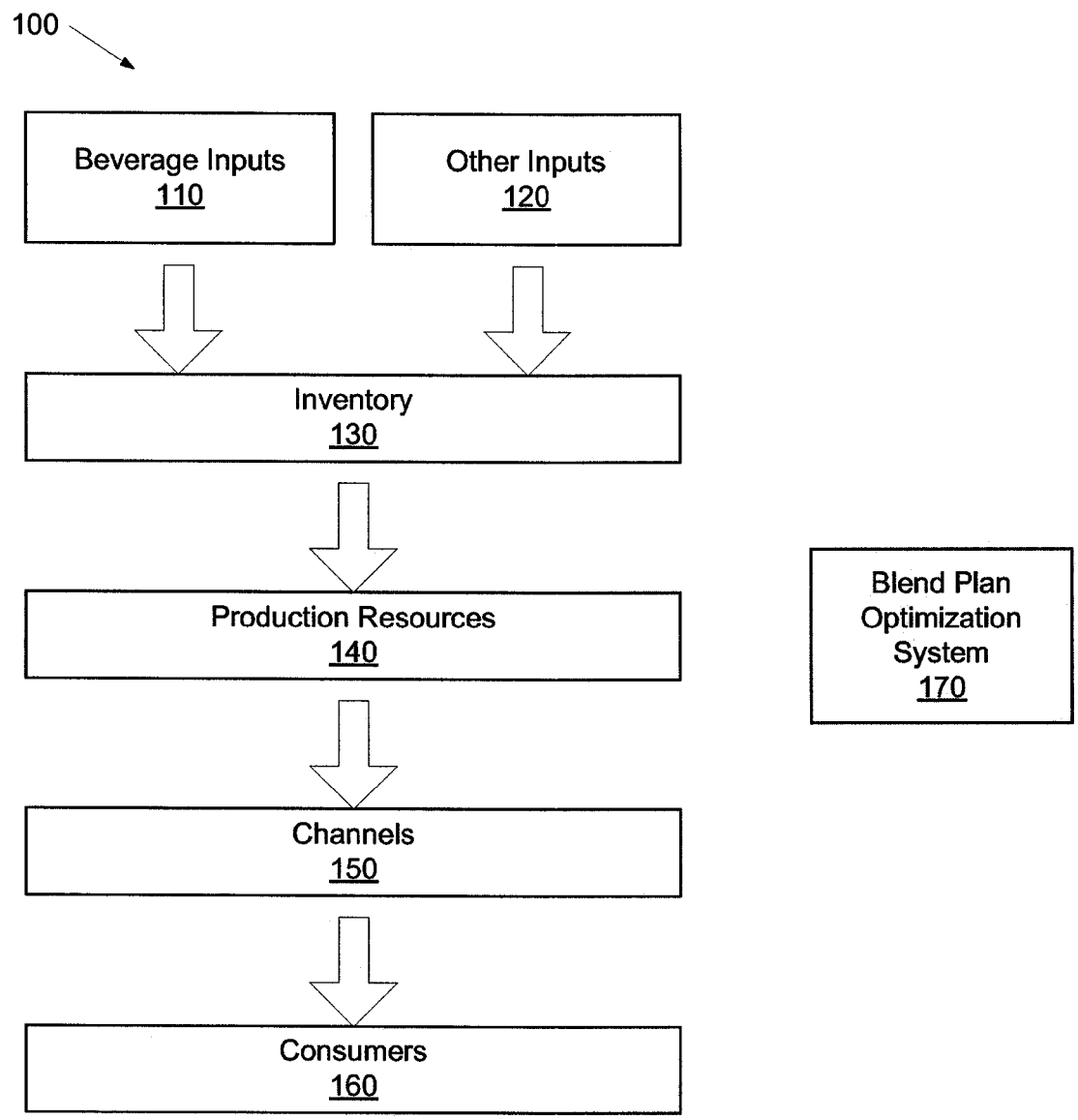
FIG. 1 is a block diagram of a drink supply chain in accordance with an illustrative embodiment.

Described herein are illustrative systems, methods, computer-readable media, etc. for optimizing drink blends. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Referring to FIG. 1, a block diagram of a drink supply chain 100 in accordance with an illustrative embodiment is shown. The drink supply chain 100 can be associated with the production and distribution of a drink (i.e., beverage) such as juice not from concentrate, juice from concentrate, carbonated beverages (i.e., soft drinks), whole grain beverages, coffees, teas, energy drinks, health drinks, beauty drinks, nutritional beverages, flavored water, milk, dairy drinks, kvass, bread drinks, non-alcoholic beverages, alcoholic beverages, wine, beer, tequila, vodka, rum, or any other beverages. The drink supply chain 100 can include beverage inputs 110, other inputs 120, inventory 130, production resources 140, channels 150, consumers 160, and a blend plan optimization system 170. The blend plan optimization system 170 can interact with each of suppliers of the beverage inputs 110, suppliers of the other inputs 120, the inventory 130, the production resources 140, the channels 150, and the consumers 160 automatically or manually, i.e., with some amount of human participation. This interaction may include communicating data to and from suppliers of the beverage inputs 110, suppliers of the other inputs 120, computers tracking the inventory 130, computers tracking the production resources 140, computers associated with the channels 150, and computers associated with the consumers 160.

The beverage inputs 110 can include any agricultural product such as, but not limited to, fruits, vegetables, grains, nuts, etc. In an illustrative embodiment, the beverage inputs 110 can include, but are not limited to, acerola concentrate, acerola puree/paste, aloevera crushed, bits, & pieces, apple concentrate, apple not from concentrate, apple puree/paste, apricot concentrate, apricot puree/paste, banana concentrate, banana puree/paste, beet concentrate, blackberry concentrate, blackberry puree/paste, blackcurrant concentrate, blueberry concentrate, blueberry puree/paste, carrot concentrate, carrot not from concentrate, carrot organic not from concentrate, carrot pulp, cashew concentrate, cherry concentrate, cherry puree/paste, chokeberry concentrate, coconut cream, cranberry concentrate, cranberry not from concentrate, gooseberry concentrate, grape concentrate, grape not from concentrate, grapefruit concentrate, grapefruit not from concentrate, grapefruit pulp, grapefruit puree/paste, guava concentrate, guava puree/paste, kiwi concentrate, kumquat puree/paste, lemon concentrate, lemon not from concentrate, lemon pulp, lime concentrate, lime not from concentrate, lime pulp, lychee concentrate, mandarin concentrate, mango concentrate, mango puree/paste, melon concentrate, mulberry concentrate, multifruit blends concentrate, orange concentrate, orange not from concentrate, orange pulp, orange wesos, papaya crushed, bits, and pieces, passion fruit concentrate, passion fruit puree/paste, passion fruit unknown, peach concentrate, peach crushed, bits, and pieces, peach puree/paste, pear concentrate, pear puree/paste, pineapple concentrate, pineapple crushed, bits, and pieces, pineapple not from concentrate, plum concentrate, plum puree/paste, pomegranate concentrate, quincy puree/paste, raspberry concentrate, raspberry puree/paste, redcurrant concentrate, rhubarb concentrate, sourcherry concentrate, sourcherry not from concentrate, strawberry concentrate, strawberry crushed, bits, and pieces, strawberry puree/paste, tamarind puree/paste, tangerine concentrate, tangerine not from concentrate, tomato concentrate, tomato puree/paste, watermelon concentrate, yumberry concentrate, yuzu concentrate, honey, sugars, milk, dairy products, spices, herbs, leaves, seeds, pistils, flour, wheat, barley, oats, rye, corn, *quinoa* and rice. For every drink or group of drinks, the beverage inputs 110 can be different. In one illustrative embodiment, the beverage inputs 110 can include fruit. For example, the fruit can include oranges. The oranges can include, for example, Valencia oranges, early/midseason navel oranges, Brazilian oranges, or Costa Rican oranges. The crops for each of the Valencia oranges, early/midseason navel oranges, Brazilian oranges, or Costa Rican oranges can be ready for market at various times, have varying cost, quality and quantity. The beverage inputs 110 can be purchased under contract or purchased on the spot market. In another example, the fruit can include apples or mangos. However, any fruit, vegetable, or fruit/vegetable product or byproduct can be used. In another illustrative embodiment, the beverage inputs 110 can include stable drink components, for example, high fructose corn syrup, flavors, starch, additives, minerals, vitamins, alcohol, carbon dioxide, phosphoric acid, citric acid, artificial sweeteners, enzymes, starch, salt, gellan gum, carrageenan, cellulose gel, cellulose gum, pectin, modified food starch, agar, guar gum, xanthan gum, propylene glycol alginate, locust bean gum, gum Arabic, etc.

The other inputs 120 can include any non-food resources used to produce a drink product. For example, the other inputs 120 can include containers, bottles, labels, water, cleaners, energy, etc. Each item in the other inputs 120 can have different cost, availability, quantity, quality, etc.; however, items identified as the other inputs 120 can typically be more predicable than those associated with the beverage inputs 110. The products associated with other inputs 120 can be purchased under contract or purchased on the spot market.

The intake of beverage inputs 110 and the other inputs 120 can be managed with the inventory 130. The inventory 130 can include on-site and off-site facilities. For example, inventory 130 can include in-house tank capacity and supplier tank capacity. The inventory 130 can include tanks, tank farms, warehousing, etc. The inventory 130 can have a capacity and a current stock of input materials, as discussed above. The inventory 130 can be associated with a computer.

The inventory 130 can be used to provide input materials to the production resources 140 for the production of drinks. The production resources 140 can include mixing machinery such as blending vats, bottling equipment, pasteurization equipment, packaging equipment, labor, etc. The production resources 140 can have a production capacity, operation cost, and limiting factors. Limiting factors can include constraints on the manufacturing process, for example, a constraint could be that once a tank is opened the entirety should be used. Another example of a constraint could be that when a production line is changed over, the production line should be sanitized. The production resources 140 can be used to produce finished units of drink product. Multiple drink products can be produced using the same production resources 140. Each drink product has a profile based on a number of attributes, discussed further below. The finished units of drink product can be in the form of various store keeping units (SKUs).

The channels 150 can be used to distribute the finished units of drink product to the consumers 160. The channels 150 can include transportation resources, warehousing, wholesale distributors, and retail outlets. The consumers 160 can purchase the finished units of drink product through the channels 150. A consumer liking for each drink product can be predicted based on the respective profile of each drink product compared to customer surveys and actual purchase data. The liking of each drink product can be used to predict a demand for each drink product. The consumers 160 can also provide data to the blend plan optimization system 170 via computer enabled surveys or manually-entered survey data.

The blend plan optimization system 170 can receive and send data from computers associated with suppliers of the beverage inputs 110, computers associated with suppliers of other inputs 120, computers associated with the inventory 130, computers associated with the production resources 140, computers associated with the channels 150, and computers associated with the consumers 160. The blend plan optimization system 170 can use data describing the beverage inputs 110, the other inputs 120, the inventory 130, the production resources 140, the channels 150, and the consumers 160 to determine, for example, possible blend plans. The blend plan optimization system 170 can optimize the blend plan to maximize or minimize multiple attributes of the blend plans, as discussed further below. In one illustrative embodiment, the blend plan optimization system 170 can predict demand of the consumers 160, obtain orders from channels 150, order the beverage inputs 110 and the other inputs 120, manage the inventory 130, and control the production resources 140. In other illustrative embodiments, the blend plan optimization system 170 can provide planning and operating information for users such as business unit managers. Advantageously, the blend plan optimization system 170 can provide cost and quality data and a common communication platform to enable cross-functional coordination to enhance blending decisions. Advantageously, the blend plan optimization system 170 can efficiently analyze multiple scenarios, vary demand, raw material attributes, and costs at a granular level to evaluate trade-offs and execute strategy.

Figure 2:
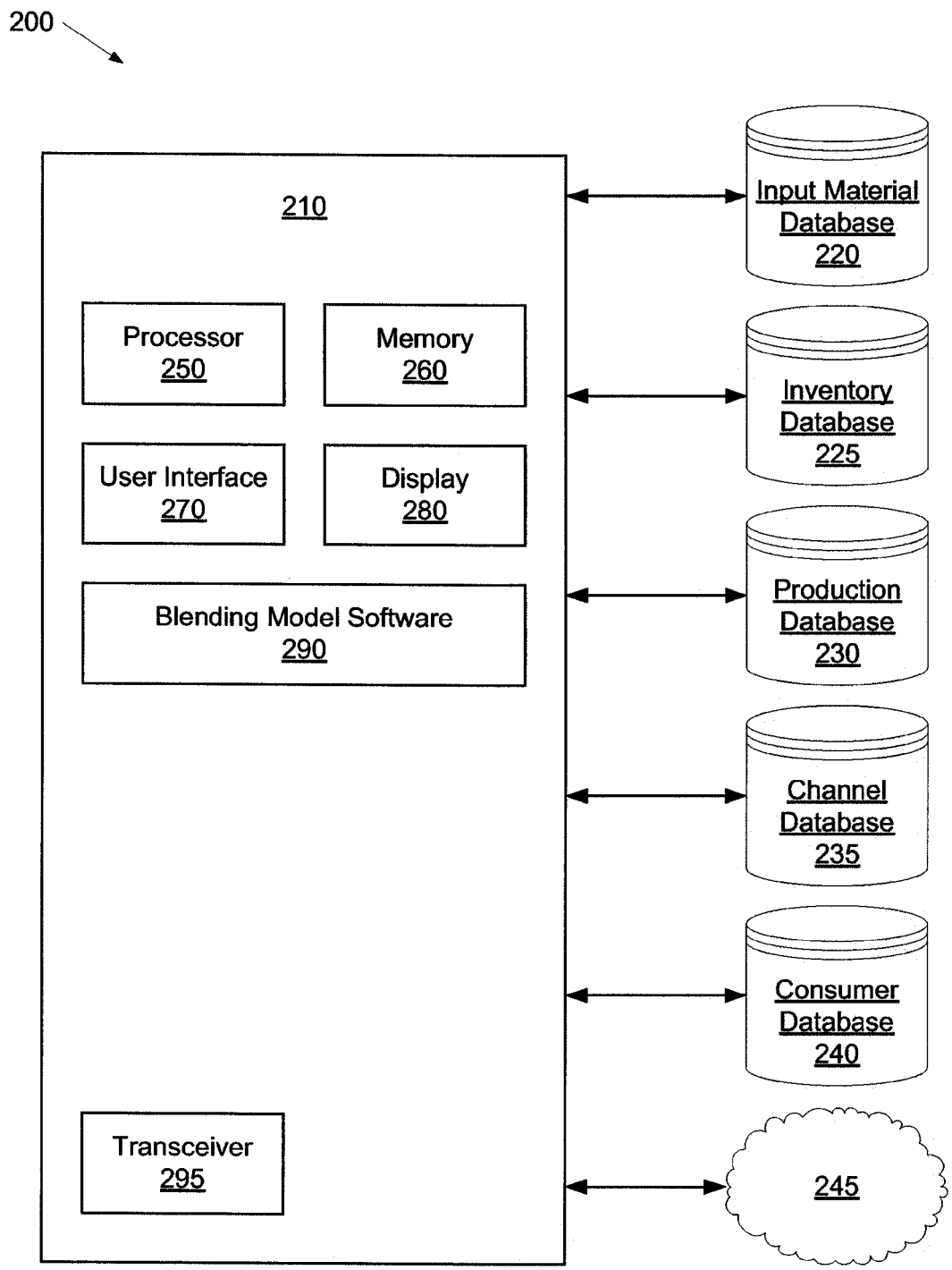
FIG. 2 is a schematic of a blend plan system in accordance with an illustrative embodiment.

Referring to FIG. 2, a schematic of a blend plan system 200 in accordance with an illustrative embodiment is shown. The blend plan system 200 can include a computing device 210, an input material database 220, an inventory database 225, a production database 230, a channel database 235, a consumer database 240, and a network 245. The computing device 210 can communicate with the input material database 220, the inventory database 225, the production database 230, the channel database 235, the consumer database 240, and the network 245. The computing device 210 can use the network 245 to communicate with other databases, suppliers, plants, storage facilities, machinery, distributors, and consumers.

Computing device 210 can include a desktop computer, a laptop computer, a cloud computing client, a hand-held computing device, or other type of computing device known to those of skill in the art. Computing device 210 can include a processor 250, a memory 260, a user interface 270, a display 280, blending model software 290, and transceiver 295. In alternative embodiments, computing device 210 may include fewer, additional, and/or different components. Memory 260, which can include any type of permanent or removable computer memory known to those of skill in the art, can be a computer-readable storage medium. Memory 260 can be configured to store blending model software 290 and an application configured to run the blending model software 290, captured data, and/or other information and applications as known to those of skill in the art. Transceiver 295 of computing device 210 can be used to receive and/or transmit information through a wired or wireless network as known to those skill in the art. Transceiver 295, which can include a receiver and/or a transmitter, can be a modem or other communication component known to those of skill in the art.

The blending model software 290 can be configured to analyze data from the input material database 220, the inventory database 225, the production database 230, the channel database 235, the consumer database 240, and the network 245 to form at least one blend plan. The data can be received by computing device 210 through a wired connection such as a USB cable and/or through a wireless connection, depending on the embodiment. The blending model software 290, which can be implemented as computer-readable instructions configured to be stored on memory 260, can optimize the at least one blend plan for all attributes simultaneously or a particular attribute.

In one embodiment, the blending model software 290 can include a computer program and/or an application configured to execute the program such as Cplex optimizing software available from International Business Machines, Inc., Armonk, N.Y. Alternatively, other programming languages and/or applications known to those of skill in the art can be used. In one embodiment, the blending model software 290 can be a dedicated standalone application. Processor 250, which can be in electrical communication with each of the components of computing device 210, can be used to run the application and to execute the instructions of the blending model software 290. Any type of computer processor(s) known to those of skill in the art may be used.

The input material database 220 can include data on beverage inputs, such as agricultural inputs, and other inputs for drink blending and packaging. Data on agricultural inputs can include attribute data for expected shipments of agricultural inputs. For example, attribute data can include information about amount, cost, timing, brix, citric acid, brix acid ratio, vitamin c (ascorbic acid), color score, viscosity, limonin, flavor, fruit variety (such as early/mid navel oranges or Valencia oranges), and a pulp profile of an expected or contracted shipment. Data on other inputs can include information about packaging materials available or expected to be available, sweeteners available, water quality, etc.

The inventory database 225 can include data on currently held beverage inputs, such as agricultural inputs, and other inputs. The data can include internal information and information about suppliers. When a shipment of an agricultural input arrives at a storage facility or plant, the agricultural input can be tested to determine attribute data. For example, tested attribute data can include information about amount, brix, citric acid, brix acid ratio, vitamin c (ascorbic acid), color score, viscosity, limonin, flavor, fruit variety, and pulp profile of a received shipment. In one illustrative embodiment, the data includes the amount of juice stored in a tank. The collected data can be stored in the inventory database 225. The data can also include information about the cost of inventory and timing of deliveries and planned use. The inventory database 225 can also include quantity, cost, and type information for other inputs such as packaging.

The production database 230 can include data on current production resources that are available for use. Production resources can include, for example, plants, storage facilities, and machinery. The data can include information about location, shipping costs, machine capacities, machine capability and machine schedules. The data can also include information about how resources are linked or related. For example, tanks 'A' and 'B' might only be piped to machine 'W.' Illustrative machinery can include blending tanks, pasteurizing equipment, and bottling machines.

The channel database 235 can include data on channels used to distribute finished product. For example, data on channels can include historical data for demand through a particular channel. Data can include information about finished inventory on hand in a particular channel. Data can also include information about the timing and requirements of contract shipments to, for example, restaurants and food service companies.

The consumer database 240 can include data on consumer demand. For example, consumer demand data can include consumer survey results and sales results. The consumer survey results and sales results can be used to build customer liking and demand models.

Figure 3:
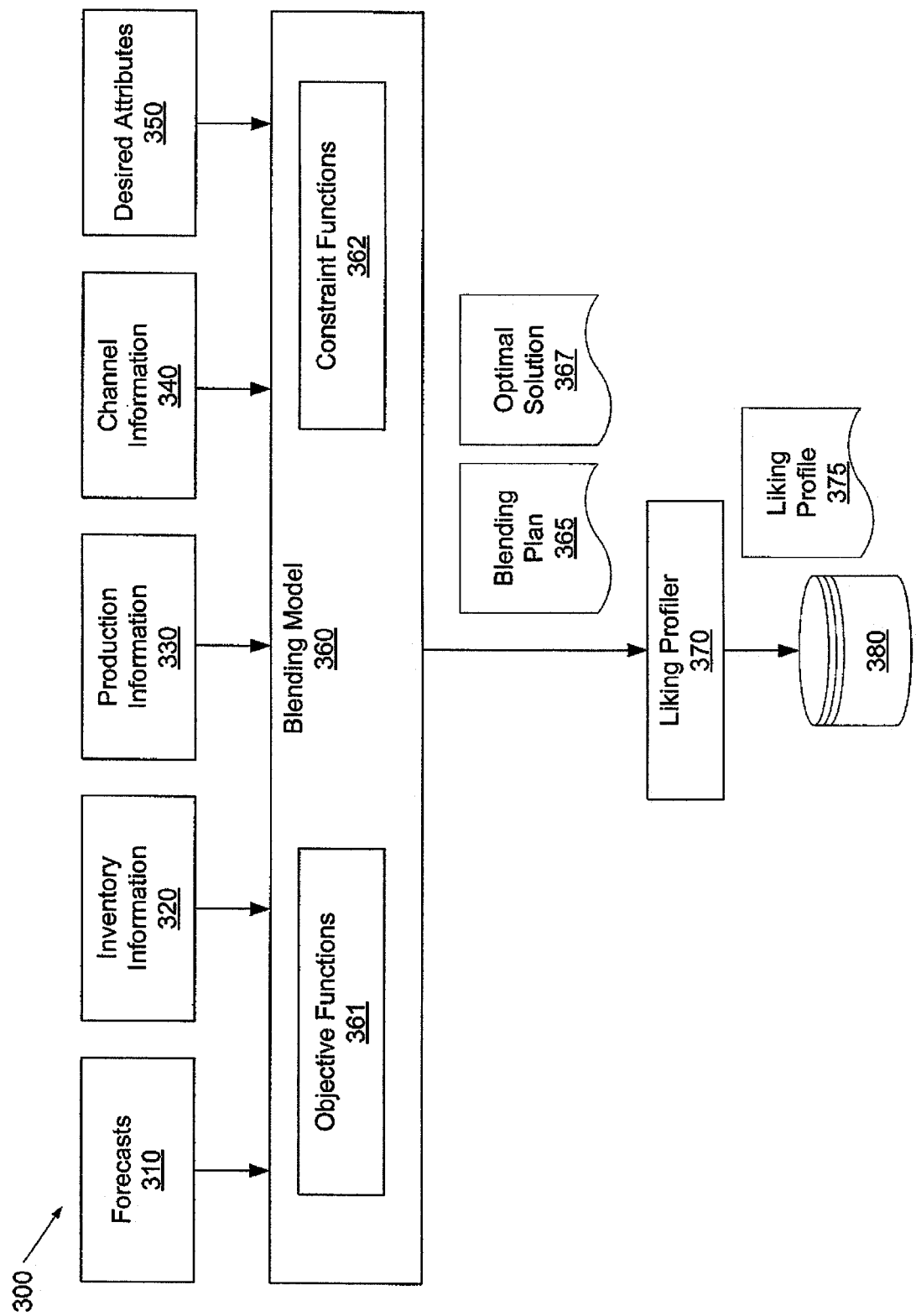
FIG. 3 is a diagram of a blending model architecture in accordance with an illustrative embodiment.

Referring to FIG. 3, a diagram of a blending model architecture 300 in accordance with an illustrative embodiment is shown. The blending model architecture 300 can include a blending model 360. Inputs to the blending model 360 can include forecasts 310, inventory information 320, production information 330, channel information 340, and desired attributes 350. The blending model 360 generates a blending plan 365 and an optimal solution 367 based on the inputs 310-350. A liking profiler 370 provides a liking profile 375 for the blending plan 365. The blending plan 365 and its optimal solution 367 and the liking profile 375 can then be stored in a database 380 for further analysis. Although a blending model for juice is described, the blending model can be applied to any agriculture-based product. The blending model can be applied to juice not from concentrate, juice from concentrate, carbonated beverages (i.e., soft drinks), whole grain beverages, coffees, teas, energy drinks, health drinks, nutritional beverages, beauty drinks, flavored water, milk, dairy drinks, kvass, bread drinks, non-alcoholic beverages, alcoholic beverages, wine, beer, tequila, vodka, rum, or any other beverages.

The forecasts 310 can include a juice forecast, a demand forecast, an inventory forecast, a production availability forecast, a fruit forecast, a vegetable forecast, a nut forecast, a grain forecast, a commodity forecast, or any other forecast. For example, the juice forecast can include an estimate of when, where, and how much fruit juice will be available for blending. The forecasts 310 can include material information such as data about beverage inputs, such as agricultural inputs, and other inputs. Forecasted attributes can include quantity, brix, citric acid, brix acid ratio, centrifuge pulp profile, vitamin c (ascorbic acid), percent recovered oil, color score, defects score, limonin, flavor, and varietal percentages (Brazilian, Early Mid, and Valencia). The pulp profile consists of information about the distribution of pulp lengths in the expected juice. The forecasts 310 can be provided manually or generated based on known and historical information stored in an input material database.

The inventory information 320 includes data on materials currently available for blending. For example, the inventory information 320 can include where and how much fruit juice is currently available for blending. Inventory attributes can include quantity, age of juice, brix, citric acid, brix acid ratio, centrifuge pulp profile, vitamin c (ascorbic acid), percent recovered oil, color score, defects score, limonin, flavor, and varietal percentages (Brazilian, Early Mid, and Valencia). The inventory information 320 can be obtained from an inventory database.

The production information 330 includes data on the available production resources. For example, production information 330 can include data about available resources such as storage capacity, storage costs, production capacity, and production costs. The production information 330 can be obtained from a production database.

The channel information 340 includes data about the wholesalers and retailers such as finished inventory on hand in a particular channel. Data can also include information about the timing and requirements of contract shipments to, for example, restaurants and food service companies. The channel information 340 can be obtained from a channel database.

Figure 4:
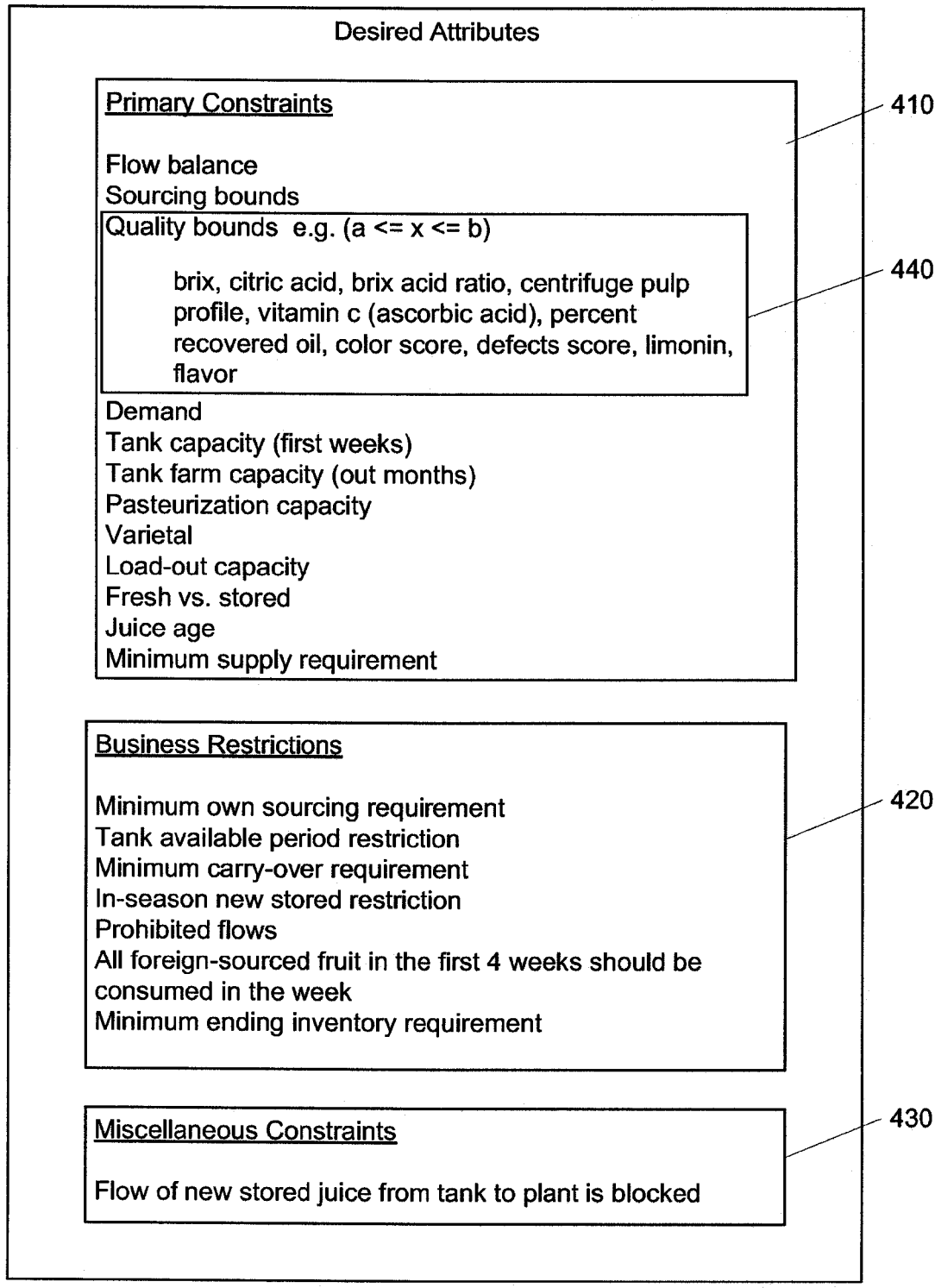
FIG. 4 is a diagram of a constraint architecture in accordance with an illustrative embodiment.

The desired attributes 350 can include a series of constraints. Referring to FIG. 4, a diagram of a constraint architecture 400 in accordance with an illustrative embodiment is shown. The constraint architecture 400 can be categorized into primary constraints 410, business restrictions 420, and miscellaneous constraints 430. The constraints and restrictions can define, for example, bounds, limits, conditions, and undesired configurations for blend plans. More or fewer constraints and restrictions can be implemented.

The primary constraints 410 can include flow balance, sourcing bounds, quality bounds 440, demand, tank capacity, pasteurization capacity, varietal, load-out capacity, fresh vs. stored, juice age, and minimum supply requirement. Flow balance can constrain the model to ensure that flow into the system equals flow out of the system plus inventory. Sourcing bounds can define minimum and maximum purchases from suppliers. For example, a supplier may have a maximum capacity.

Quality bounds 440 can define the attributes of multiple finished products. Quality bounds 440 can include brix, citric acid, brix acid ratio, centrifuge pulp profile, vitamin c (ascorbic acid), percent recovered oil, color score, defects score, limonin, and flavor score. The quality bounds 440 can set minimum levels, maximum levels, or minimum and maximum ranges for an attribute. Each product or SKU can have a separate set of quality bounds 440.

Demand can set bounds for amount of finished product to be produced. Tank farm capacity can define the maximum amount of tank capacity available for a particular time period, for example, a week, a month, etc. Pasteurization capacity can define the maximum amount of juice that can be pasteurized at a plant. Varietal can define the bounds for the ratio of early/midseason fruit to Valencia fruit to foreign fruits used in a product. Load-out capacity can define the maximum ability of a location to ship out product. Fresh vs. stored can define the bounds for the ratio of the amount fresh juice in a product to the amount stored juice in the product. Juice age can define that maximum amount of time juice can sit in a tank before the juice should be used. Minimum supply requirements can define the minimum amount supply purchases that must be made because of, for example, a contract.

Business restrictions 420 can include, for example, minimum own sourcing requirements, tank available period restriction, minimum carry-over requirement, in-season new stored restriction, prohibited flows, consumption requirements, and minimum ending inventory requirement. Minimum own sourcing requirements can define the minimum amount of fruit or juice that should be sourced internally, i.e., from farms owned by the company. The tank available period restriction can define time periods for which particular tanks are available, i.e., not scheduled for use. The minimum carry-over requirement can define how much input inventory should be maintained at the end of a production plan period. The in-season new stored restriction can define how much new fruit juice can be stored in tanks. Prohibited flows define restrictions on process flows such as moving stored juice from a first plant to a second plant. Consumption requirements can define how soon particular inputs should be used after being received. For example, a consumption requirement can be that all foreign-sourced fruit should be consumed within a certain time period, for example, within a week of reception. The minimum ending inventory requirement can define how much stock on hand that should be maintained for a product.

Miscellaneous constraints 430 can include situational or test constraints. For example, miscellaneous constraints 430 can include that flow of new stored juice from tank to plant is blocked. Any other constraint can also be included.

Referring again to FIG. 3, the blending model 360 can include objective functions 361 and constraint functions 362. The objective functions 361 and the constraint functions 362 can be a system of linear equations. The blending model 360 can be a constraint program with a mix of continuous and integer variables with some logical constraints. The blending model 360 can iteratively find solutions for objective functions 361 and the constraint functions 362 using various techniques such as interior point methods. For example, the system of linear equations can be solved using Cplex optimizing software available from International Business Machines, Inc., Armonk, N.Y. A range of possible solutions can be produced. The possible solutions for objective functions 361 and the constraint functions 362 are valid blending plans 365. The blending plans 365 are plans that define the inputs to use, resources to use, and products to be made.

The objective functions 361 define the objectives of the analysis. In one illustrative embodiment, the objective can be to minimize cost. However, any objective is possible including maximizing quality, or minimizing carbon footprint. The objective functions 361 can also include secondary and tertiary objectives, etc. The solution for the objective functions 361 can be the optimal solution 367. The optimal solution 367 can be the set of variable values, decisions, and associated objective function value that maximizes and/or minimizes the objective function, subject to the constraints. For example, the optimal solution 367 can be the minimized cost calculated for a particular blending plan 365.

In one illustrative embodiment, the objective functions 361 include expressions that represent the various costs involved in producing juice. For example, objective functions 361 can include a process cost expression, a storage cost expression, and a transportation cost expression. For example, for a particular supplier, plant, and transport, the expression can be: cost=supply cost per gallon*gallons+ production cost per gallon*gallons+transportation cost per gallon*gallons. The sum of these expressions can equal the total cost of producing and delivering finished juice products. In one illustrative embodiment, the total cost of producing and delivering finished juice products is the optimal solution 367. The objective functions 361 can also include preference terms and penalties. For example, penalties can include a fresh juice penalty, an overproduction penalty, and a flow penalty. In one example, the preference terms are counted as reduced costs and penalties are counted as increased costs.

The possible solutions for the objective functions 361 are limited by valid combinations defined by the constraint functions 362. An illustrative constraint function for brix of the finished product, can be: 10<brix<14. Thus, only blending plans 365 where the finished product has a brix greater than 10 but less than 14 are valid blending plans 365. Another illustrative constraint function for pulp profile can be: 2 grams/deciliter<fine pulp (<2 mm)<4 grams/deciliter; 5 grams/deciliter<medium pulp (2-5 mm)<8 grams/deciliter; 2 grams/deciliter<large pulp (>5 mm)<4 grams/deciliter. Thus, only blending plans 365 where the finished product has a pulp profile that fits within these pulp profile constraints are valid blending plans 365.

The blending model 360 can be executed using a branch and bound method and/or an interior point method. In an illustrative embodiment, the objective functions 361 and constraint functions 362 can be combined to form a math program. The math program can optimize the objective functions 361 subject to the constraint functions 362. After an optimal blending plan 365 is determined in view of the constraint functions 362, inputs to the model can be changed to evaluate different scenarios. The optimal solution 367 for the objective functions 361, as well as the respective blending plan 365, can be stored for further analysis. After the objective functions 361 have been solved for a number of valid blending plans 365 (resulting in a respective number of optimal solutions 367), the best optimal solution 367 (e.g., minimum cost solution) can be selected. The granularity of the blending plans 365 can be changed to increase the execution speed or increase the precision of the blending model 360. Alternatively, the blending model 360 can be executed using a Monte Carlo-type methodology.

Figure 8:
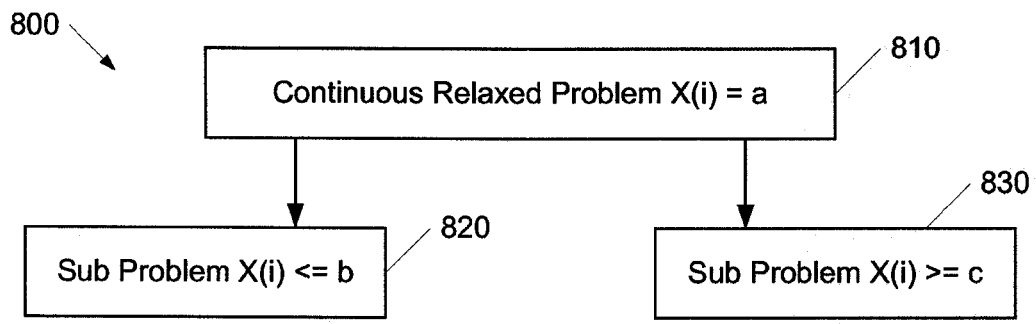
FIG. 8 is a flowchart of operations performed in a branch and bound method in accordance with an illustrative embodiment.

Referring to FIG. 8, a flowchart of operations performed in a branch and bound method 800 in accordance with an illustrative embodiment is shown. Additional, fewer or different operations may be performed. In an operation 810, a continuous relaxed problem (X(i)=a) can be defined.

The integer requirements of the continuous relaxed problem are relaxed and the continuous relaxed problem can be solved as a continuous variable problem. This relaxed problem can be solved using an interior point algorithm, or a gradient descent algorithm. A variable (X(i)) can selected to 'branch' on based on the partial derivative of the objective function, projected on to the constraint surface, with respect to the variable. In an operation 820, along one branch the branching variable is constrained to be less than or equal to the next lowest integer value, e.g., sub problem X(i)<=b. In an operation 830, along the other branch the branching variable is constrained to be greater than or equal to the next highest value, e.g., sub problem X(i)>=c. The resulting sub-problems are solved until an optimal solution is found that obeys all constraints and integrality requirements. A branch and cut algorithm can also be used, and branch and bound and branch and cut can be used in combination.

Figure 9:
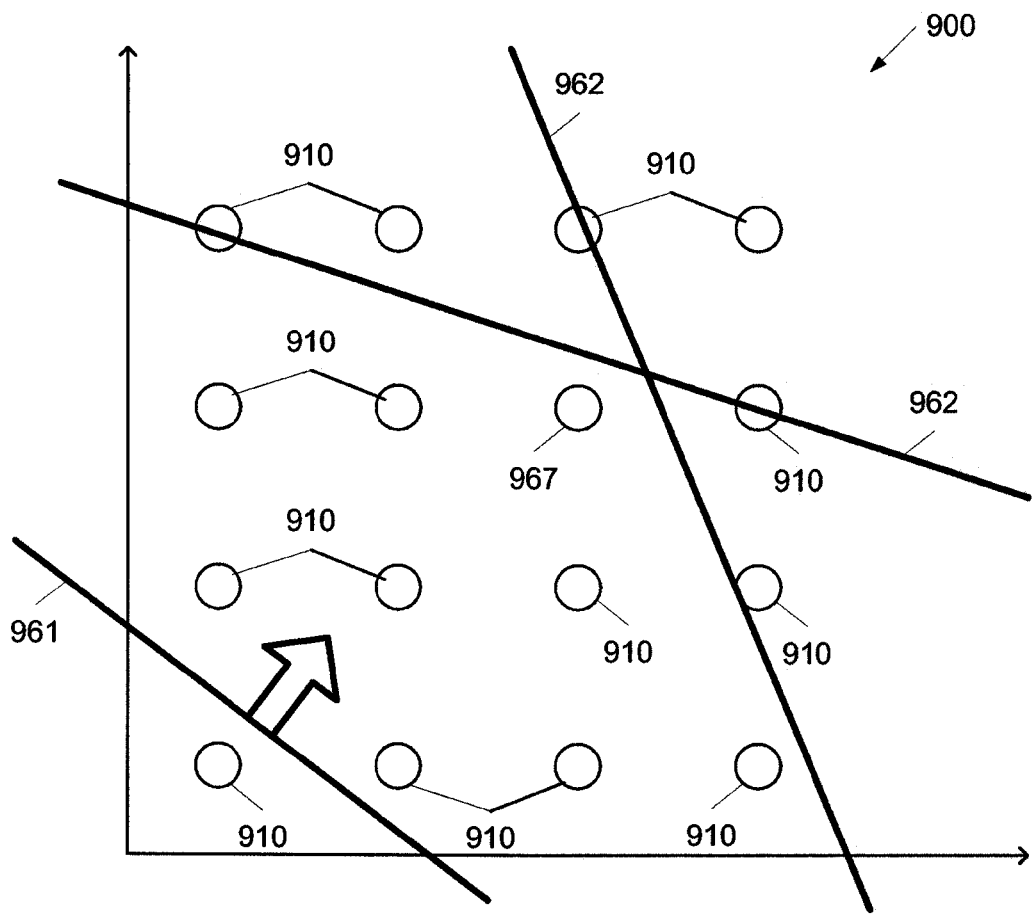
FIG. 9 is a diagram of an interior point approach in accordance with an illustrative embodiment.

Referring to FIG. 9, a diagram of an interior point approach 900 in accordance with an illustrative embodiment is shown. In an illustrative embodiment, the interior point approach 900 is a two dimensional linear integer program. In the interior point approach 900, constraint functions 962 are projected onto integer points 910. In an illustrative embodiment, all integer points 910 located above constraint functions 962 are not valid solutions. An objective function 961 can be optimized (i.e., re-plotted in the direction of the arrow) until only one of the integer points 910 below the constraint functions 962 remains above the objective function 961. In FIG. 9, an optimal solution 967 is the last integer point below the constraint functions 962 that remains above the objective function 961. Thus, the optimal solution 967 maximizes the objective function 961 while remaining within the bounds of the constraint functions 962. In other embodiments, multiple dimensions and multiple objective functions can be used.

Referring again to FIG. 3, each valid blending plan 365 can be processed by the liking profiler 370. The liking profiler 370 can be a model of consumer liking based on the attributes of a product. In one illustrative embodiment, the liking profiler 370 can be a multi-dimensional mathematical model that associates a liking score with the brix, citric acid, brix acid ratio, centrifuge pulp profile, vitamin c (ascorbic acid), percent recovered oil, color score, defects score, limonin, and flavor score of a product. More or fewer attributes can be included. The attributes can be weighted. The liking score can be a relative value. The liking score can be a scalar, vector, or random variable. The multi-dimensional mathematical model can be populated with data from consumer surveys and consumer purchase information. The data from consumer surveys and data from consumer purchase information can be stored in a consumer database. For example, in a consumer survey, a consumer is given a product to try where the product has known attributes. The consumer can complete a consumer survey rating various feelings toward the product. For example, the consumer can rate the mouth feel of the product on a scale of one to ten. A statistical model can be constructed using the responses of multiple consumers. Similarly, a statistical model can be constructed using product purchasing information matched with product attributes. The multi-dimensional mathematical model is a compilation of these data describing consumers. For a given brix, citric acid, brix acid ratio, centrifuge pulp profile, vitamin c (ascorbic acid), percent recovered oil, color score, defects score, limonin, and flavor score of a product, the multi-dimensional mathematical model can produce a liking score. The liking profiler 370 will score each product in the blending plan 365. The liking profiler 370 returns the liking profile 375 which can consist of the liking score for each product in the blending plan 365. Alternatively, the liking profiler 370 can return a liking score for each SKU.

The blending plan 365 and its optimal solution 367 and liking profile 375 can be stored in a database 380 for display or further analysis. The results of the analysis can be interactively displayed. For example, a graph of blending plans 365 showing cost (i.e., optimal solution 367) versus liking (i.e. liking profile 375) can be presented to a user such as a business unit manager. The user can also change the various attributes, constraints, cost structures and resources available to simulate how changes will effect the drink production system. Sensitivity analyses can include automatically generating scenarios where attributes, constraints, cost structures and resources are changed by a percentage, for example, ten percent.

In addition, the variability of the attributes, constraints, cost structures and resources can be tracked over time and/or simulated and displayed for analysis. Since the inputs to the drink production process can have a large variance, it can be difficult for managers to identify sections of the drink production process that are poorly controlled. In an illustrative embodiment, the constraint functions 362 can include production limits that establish operating tolerances of the production resources. In another illustrative embodiment, the objective functions 361 can include minimizing variance in one or more of the forecasts 310, the inventory information 320, the production information 330, the channel information 340, and the desired attributes 350. By simulating various production scenarios, managers can identify high variability sections of the drink production process. Further, the drink production system can determine and track the variability in a section of the drink production process based on the variability of the inputs to the particular section of the drink production process. Thus, a manager can differentiate a section of the drink production process that is necessarily variable from a section of the drink production process that is out of control and needs improvement. Further, the manager can simulate how the process would change if variability is reduced in a particular process section. For example, the manager could determine that 1% improvement in the variance of machine changeover could result in a 3% increase in process throughput. Thus, the manager could focus on improving changeover performance.

Advantageously, the blending model architecture can provide cost and quality data and a common communication platform to enable cross-functional coordination to enhance blending decisions. Advantageously, the blending model architecture can efficiently analyze multiple scenarios, vary demand, raw material attributes, and costs at a granular level to evaluate tradeoffs and execute strategy. Advantageously, users can interact with various blending plans 365 to better understand possible blending plans 365 that meet business objectives.

Figure 5:
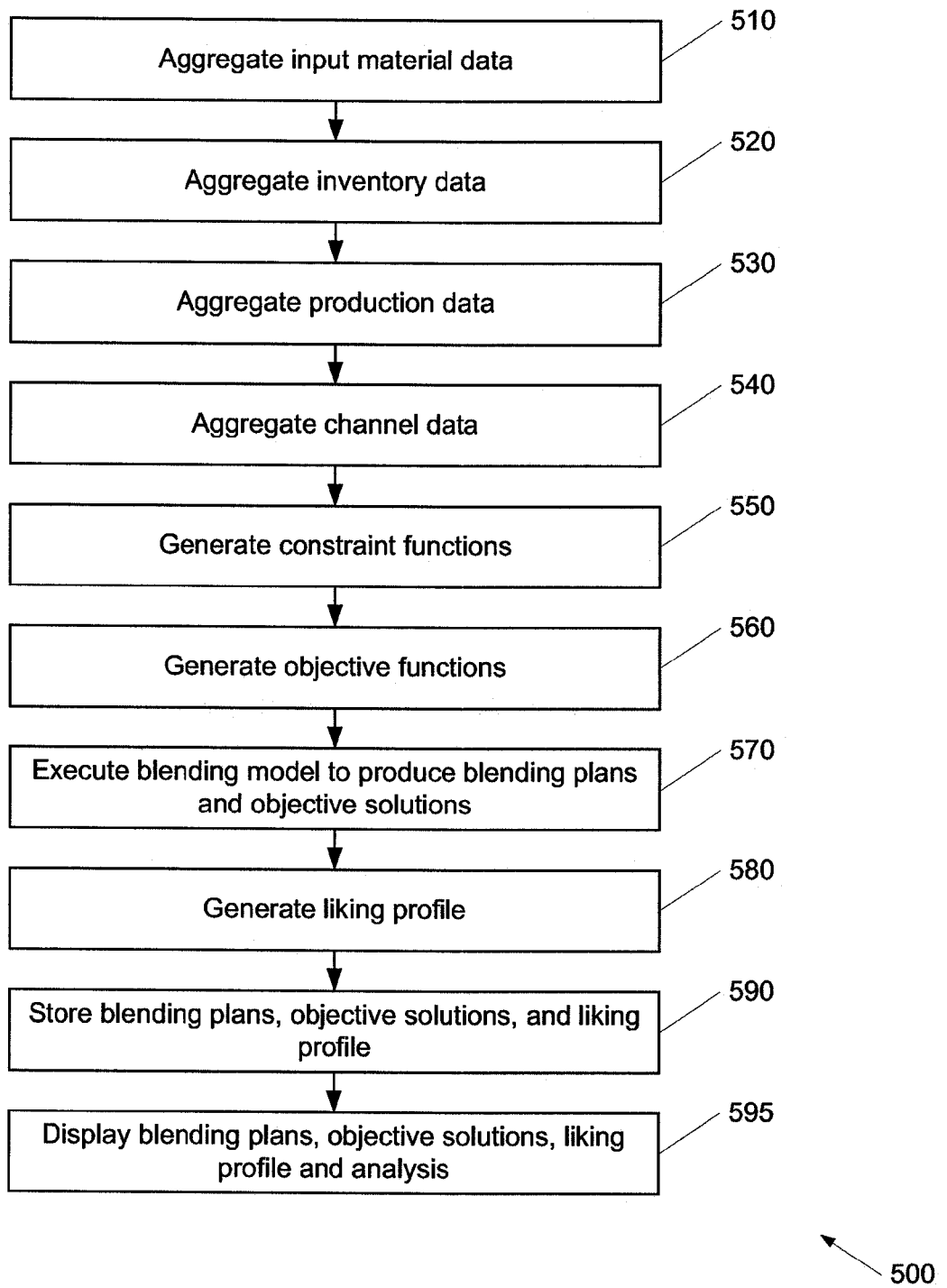
FIG. 5 is a flowchart of operations performed by a blending plan system in accordance with an illustrative embodiment.

Referring to FIG. 5, a flowchart of operations performed by a blending plan system 500 in accordance with an illustrative embodiment is shown. Additional, fewer or different operations may be performed. In an operation 510, input material data can be aggregated by the blending plan system. The blending plan system can query an input material database for data on beverage inputs, such as agricultural inputs, and other inputs for drink blending and packaging. Data on agricultural inputs can include attribute data for expected shipments of agricultural inputs. For example, attribute data can include information about amount, cost, timing, brix, citric acid, brix acid ratio, vitamin c (ascorbic acid), color score, viscosity, limonin, flavor, fruit variety (such as early/mid navel oranges or Valencia oranges), and pulp profile of an expected or contracted shipment. Data on other inputs can include information about packaging materials available or expected to be available, sweeteners available, water quality, etc. The input material data can include a forecast.

In an operation 520, inventory data can be aggregated by the blending plan system. The blending plan system can query an inventory database for data on currently held beverage inputs, such as agricultural inputs, and other inputs. The data can include internal information and information about suppliers. For example, attribute data can include information about amount, cost, timing, brix, citric acid, brix acid ratio, vitamin c (ascorbic acid), color score, viscosity, limonin, flavor, fruit variety, and pulp profile of a received shipment. In one illustrative embodiment, the data includes the amount of juice stored in a tank. The data can also include quantity, cost, and type information for other inputs such as packaging.

In an operation 530, production data can be aggregated by the blending plan system. The blending plan system can query a production database for data on current production resources that are available for use. Production resources can include, for example, plants, storage facilities, and machinery. The data can include information about location, shipping costs, machine capacities, machine capability and machine schedules. The data can also include information about how resources are linked and related. Illustrative machinery can include blending tanks, pasteurizing equipment, and bottling machines.

In an operation 540, channel data can be aggregated by the blending plan system. The blending plan system can query a channel database for data on channels used to distribute finished product. For example, data on channels can include historical data for demand through a particular channel. Data can include information about finished inventory on hand in a particular channel. Data can also include information about the timing and requirements of contract shipments to, for example, restaurants and food service companies.

In an operation 550, the blending plan system can generate constraint functions based on the aggregated input data, the aggregated inventory data, the aggregated production data, and the aggregated channel data, as described above. The constraint functions limit valid blending plans to the available and potential inputs, inventory, production resources, and channel resources. The constraint functions also limit valid blending plans to desired product attributes and operational constraints.

In an operation 560, the blending plan system can generate objective functions based on a desired objective, as described above. For example, a desired objective can be minimizing cost. Objective functions can also include secondary and tertiary objectives, for example, maximizing quality.

In an operation 570, the blending plan system can execute a blending model to produce blending plans and optimal solutions based on the constraint functions and objective functions, as described above. The objective functions and the constraint functions can be a system of linear equations. The blending model can be a constraint program with a mix of continuous and integer variables with some logical constraints. The blending model can iteratively find solutions for the objective functions and the constraint functions using various techniques such as interior point methods. For example, the system of linear equations can be solved using Cplex optimizing software available from International Business Machines, Inc., Armonk, N.Y. A range of possible solutions can be produced. The possible solutions for objective functions and the constraint functions are blending plans. The blending plans are plans that define the inputs to use, resources to use, and products to be made.

In an operation 580, the blending plan system can generate a liking profile for each blending plan, as described above. The liking profile can be determined using a model of consumer liking based on the attributes of a product. In one illustrative embodiment, a multidimensional mathematical model that associates a liking score with the brix, citric acid, brix acid ratio, centrifuge pulp profile, vitamin c (ascorbic acid), percent recovered oil, color score, defects score, limonin, and flavor score of a product can be used to generate a liking profile. More or fewer attributes can be included. The liking profile can consist of the liking score for each product in the blending plan. Alternatively, the liking profile can consist of the liking score for each SKU in the blending plan.

In an operation 590, the blending plan system can store the blending plan and its optimal solution and liking profile in a database for implementation, display or further analysis. In an operation 595, the blending plan results and related analysis can be interactively displayed. For example, a graph of blending plans showing cost (i.e., optimal solution) versus liking (i.e. liking profile) can be presented to a user such as a business unit manager. The user can also change the various attributes, constraints, cost structures and resources available to simulate how changes will effect the drink production system. Sensitivity analyses can include automatically generating scenarios where attributes, constraints, cost structures and resources are changed by a percentage, for example, ten percent.

In addition, the variability of the attributes, constraints, cost structures and resources can be tracked over time and/or simulated and displayed for analysis. Since the inputs to the drink production process can have a large variance, it can be difficult for managers to identify sections of the drink production process that are poorly controlled. By simulating various production scenarios, managers can identify high variability sections of the drink production process. Further, the drink production system can determine and track the variability in a section of the drink production process based on the variability of the inputs to the particular section of the drink production process. Thus, a manager can differentiate a section of the drink production process that is necessarily variable from a section of the drink production process that is out of control and needs improvement. Alternatively, the blend plan system can use the blending plans order material inputs, manage inventory, and control the production resources such as mixing machinery.

Advantageously, the blending model system can provide cost and quality data and a common communication platform to enable cross-functional coordination to enhance blending decisions. Advantageously, the blending model system can efficiently analyze multiple scenarios, vary demand, raw material attributes, and costs at a granular level to evaluate tradeoffs and execute strategy. Advantageously, users can interact with various blending plans to better understand possible blending plans that meet business objectives.

Figure 6:
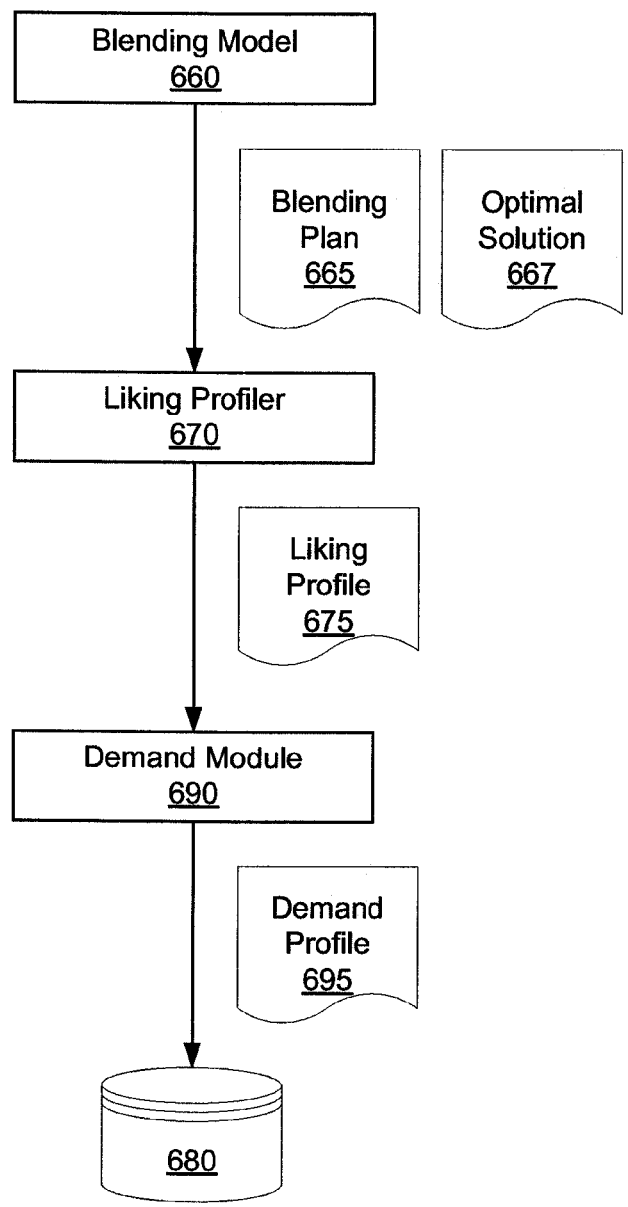
FIG. 6 is a diagram of a blending model architecture in accordance with an illustrative embodiment.

Referring to FIG. 6, a diagram of a blending model architecture 600 in accordance with an illustrative embodiment is shown. The blending model architecture 600 can include a blending model 660, as discussed above. Inputs to the blending model 660 can include a forecast, inventory information, production information, channel information, and desired attributes, as described above. The blending model 660 generates a blending plan 665 and an optimal solution 667 based on the inputs. A liking profiler 670 provides a liking profile 675 for the blending plan 665. The blending plan 665 and its optimal solution 667 and liking profile 675 can then be provided to a demand module 690. The demand module 690 can generate a demand profile 695 for the blending plan 665. The blending plan 665 and its optimal solution 667, liking profile 675, and demand profile 695 can then be stored in a database 680 for further analysis. Although a blending model for juice is described, the blending model can be applied to any agriculture-based product. The blending model can be applied to from concentrate juice or not from concentrate juice.

As discussed above, the each valid blending plan 665 can be processed by the liking profiler 670. The liking profiler 670 can be a model of consumer liking based on the attributes of a product. In one illustrative embodiment, the liking profiler 670 can be a multi-dimensional mathematical model that associates a liking score with the brix, citric acid, brix acid ratio, centrifuge pulp profile, vitamin c (ascorbic acid), percent recovered oil, color score, defects score, limonin, and flavor score of a product. More or fewer attributes can be included. The attributes can be weighted. The liking score can be a relative value. The liking score can be a scalar, vector, or random variable. The multi-dimensional mathematical model can be populated with data from consumer surveys and consumer purchase information. The multi-dimensional mathematical model is a compilation of these data describing consumers. For a given brix, citric acid, brix acid ratio, centrifuge pulp profile, vitamin c (ascorbic acid), percent recovered oil, color score, defects score, limonin, and flavor score of a product, the multi-dimensional mathematical model can produce a liking score. The liking profiler 670 will score each product in the blending plan 665. The liking profiler 670 returns the liking profile 675 which can consist of the liking score for each product in the blending plan 665. Alternatively, the liking profiler 670 can return a liking score for each SKU.

The demand module 690 can generate the demand profile 695 for the blending plan 665 based on the liking profile 675. The demand module 690 can include a demand model of likely demand based on consumer liking of the attributes of products to be released into a market and the total volume and form of the products to be released into the market. The demand model can be a multi-dimensional mathematical model or statistical model that associates a liking score with historical purchase data. A demand curve can be generated for each product or SKU of the blending plan 665. The demand model can account for cannibalism amongst the products or SKUs based on the volume or units produced according to the blending plan 665. The volume or units produced for each product or SKU according to the blending plan 665 can be used to calculate a proposed price for the a product on the demand curve. The demand profile 695 can include the demand curve for each product and a proposed price for each product.

The demand module 690 can then calculate the profit of the blending plan 665 at various price points using the demand profile 695 and the cost structure information of the optimal solution 667 for the blending plan 665. Using a system of equations for each product or SKU, such as objective functions and constraint functions described above, the demand module 690 can maximize the profit by testing various price scenarios against the demand profile 695.

In addition, after many runs of the blending model 660, the demand module 690 can use the volume or units produced according to a plurality of blending plans 665 along with the cost structure information of the optimal solutions 667 of the plurality of blending plans 665 to generate a supply curve for a company. In other words, the blending model 660 can build a supply curve based on the (minimized) cost, or price, of providing a particular volume of product. Each of the blending plans 665 can provide a data point for generating the supply curve. Alternatively, the supply curve can be constructed using prior blending plans 765 stored in the database 780.

The blending plan 665 and its optimal solution 667, liking profile 675, and demand profile 695 can be stored in a database 680 for display or further analysis. The results of the analysis can be interactively displayed. For example, a graph showing the demand curves for each product or SKU of the demand profile 695 can be presented to a user such as a business unit manager. A graph showing the supply curve each product or SKU can also be presented. The user can change the various attributes, constraints, cost structures and resources available to simulate how changes will effect the supply and demand of products of the drink production system. In addition, a user can choose various price points to manipulate to see how different prices will affect profitability. Sensitivity analyses can include automatically generating scenarios where attributes, constraints, cost structures and resources are changed by a percentage, for example, ten percent.

Advantageously, the blending model architecture can provide supply and demand data and a common communication platform to enable cross-functional coordination to enhance blending decisions. Advantageously, the blending model architecture can efficiently analyze multiple scenarios, vary demand, raw material attributes, and costs at a granular level to evaluate trade-offs and execute strategy. Advantageously, users can interact with various blending plans 665 to better understand possible supply and demand scenarios.

Figure 7:
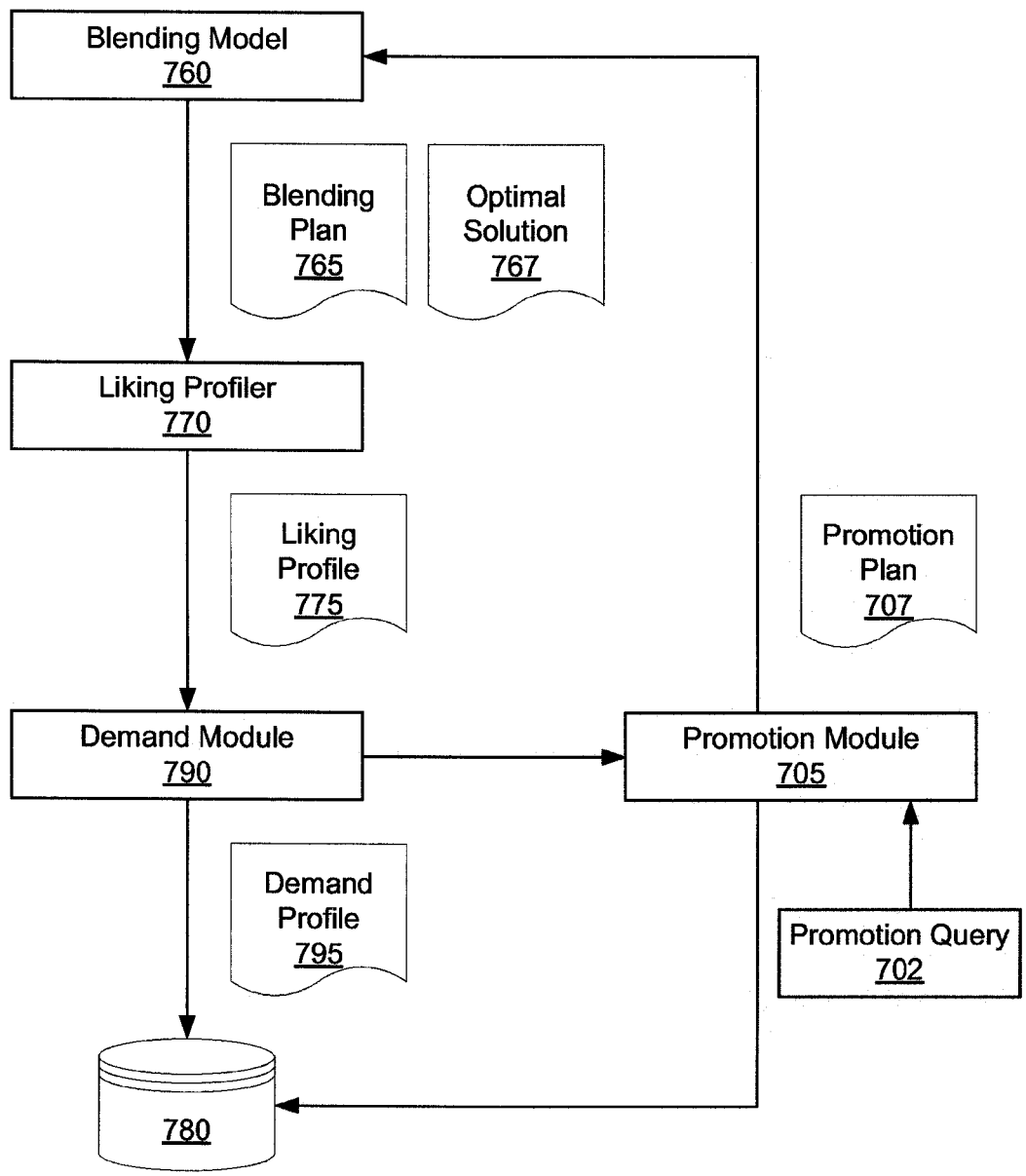
FIG. 7 is a diagram of a blending model architecture in accordance with an illustrative embodiment.

Referring to FIG. 7, a diagram of a blending model architecture 700 in accordance with an illustrative embodiment is shown. The blending model architecture 700 can include a blending model 760, as discussed above. Inputs to the blending model 760 can include a forecast, inventory information, production information, channel information, and desired attributes, as described above. The blending model 760 generates a blending plan 765 and an optimal solution 767 based on the inputs. A liking profiler 770 provides a liking profile 775 for the blending plan 765. The blending plan 765 and its optimal solution 767 and liking profile 775 can then be provided to a demand module 790. The demand module 790 can generate a demand profile 795 for the blending plan 765. The blending plan 765 and its optimal solution 767, liking profile 775 and demand profile 795 can then be provided to a promotion module 705 along with a promotion query 702. The promotion module 705 can generate a promotion plan 707 for the blending plan 765. The blending plan 765 and its optimal solution 767, liking profile 775, demand profile 795, promotion plan 707 can then be stored in a database 780 for further analysis. Although a blending model for juice is described, the blending model can be applied to any agriculture-based product. The blending model can be applied to from concentrate juice or not from concentrate juice.

As discussed above, the each valid blending plan 765 can be processed by the liking profiler 770. The liking profiler 770 can be a model of consumer liking based on the attributes of a product. In one illustrative embodiment, the liking profiler 770 can be a multi-dimensional mathematical model that associates a liking score with various attributes of a product. The multi-dimensional mathematical model can be populated with data from consumer surveys and consumer purchase information. The multi-dimensional mathematical model is a compilation of these data describing consumers. For a given attribute mix of a product, the multi-dimensional mathematical model can produce a liking score. The liking profiler 770 will score each product in the blending plan 765. The liking profiler 770 returns the liking profile 775 which can consist of the liking score for each product in the blending plan 765. Alternatively, the liking profiler 770 can return a liking score for each SKU.

The demand module 790 can generate the demand profile 795 for the blending plan 765 based on the liking profile 775. The demand module 790 can include a demand model of likely demand based on consumer liking of the attributes of products to be released into a market and the total volume and form of the products to be released into the market. The demand model can be a multi-dimensional mathematical model or statistical model that associates a liking score with historical purchase data. A demand curve can be generated for each product or SKU of the blending plan 765. The demand model can account for cannibalism amongst the products or SKUs based on the volume or units produced according to the blending plan 765. The volume or units produced for each product or SKU according to the blending plan 765 can be used to calculate a proposed price for the a product on the demand curve. The demand profile 795 can include the demand curve for each product and a proposed price for each product.

In addition, after many runs of the blending model 760, the demand module 790 can use the volume or units produced according to a plurality of blending plans 765 along with the cost structure information of the optimal solutions 767 of the plurality of blending plans 765 to generate a supply curve for a company. Each of the blending plans 765 can provide a data point for generating the supply curve.

The promotion module 705 can test promotion scenarios by manipulating constraints of the blending model 760 or by mining blending plans 765 previously stored in the database 780. The promotion module 705 can receive the promotion query 702. The promotion query 702 provides constraints or restrictions related to how to deploy a promotion. The promotion query 702 can be a lump sum of promotion money or a targeted sum of promotion money. Likewise, other promotions, for example, coupons, toys, free samples, etc., can be simulated as promotion money. For example, the promotion query 702 can be directed to finding the most profitable way to spend two hundred thousand dollars of promotion money. In another example, the promotion query 702 can be directed to determining the effect of spending two hundred thousand dollars on the promotion of a specific product.

In an illustrative embodiment, the effect of the promotion can be modeled as reducing the cost structure of the inputs of a product. The promotion module 705 can manipulate current constraints and introduce new constraints to the blending model 760. The promotion plan 707 can include the set of new constraints and changes to the current constraints. For example, promotion module 705 can direct the blending model 760 to reduce the input costs of product 'X' by ten cents/gallon and create another constraint that states that the number of gallons of product 'X' times ten cents cannot exceed two hundred thousand dollars. The blending model 760 can be iterated until valid blending plans 765 are found that satisfy the new promotion constraints. Various constraints can be employed to simulate target promotions. When a valid blending model 760 is found, the promotion plan 707 can be stored as a valid promotion plan 707. The valid promotion plan 707 can the be used by a business manager for implementing a promotion campaign.

Alternatively, the promotion module 705 can instruct the demand module 790 to use a specific price for a target product during analysis. The demand module 790 can determine the maximum profit without the promotion and with the promotion. The promotion module 705 can force the blending model to generate valid blending plans 765 until a maximum profit is determined in the situation with the promotion, but where the difference in the maximum profit without the promotion and with the promotion is equal to the promotion amount. In one illustrative embodiment, random blend plans can be injected into the liking profiler to promote discovery of valid blending plans 765. The promotion plan 707 can be derived based on the differences between the specific price for the target product and the proposed price for the target product calculated by the demand module 790.

The blending plan 765 and its optimal solution 767, liking profile 775, demand profile 795, promotion query 702, and promotion plan 707 can be stored in a database 780 for display or further analysis. The results of the analysis can be interactively displayed. For example, a graph or table showing possible promotion query 702 and promotion plan 707 sets can be presented to a user such as a business unit manager. The user can change the various attributes, constraints, cost structures and resources available to simulate how changes will effect the promotion. Sensitivity analyses can include automatically generating scenarios where attributes, constraints, cost structures and resources are changed by a percentage, for example, ten percent.

Advantageously, the blending model architecture can provide promotion data and a common communication platform to enable cross-functional coordination to enhance blending decisions. Advantageously, the blending model architecture can efficiently analyze multiple promotion scenarios, vary demand, raw material attributes, and costs at a granular level to evaluate trade-offs and execute strategy. Advantageously, users can interact with various blending plans 765 to better understand possible promotion scenarios.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for optimizing blending comprising:
   a processor configured to:
   aggregate material information for mass production of at least one product, wherein the material information is associated with a product input of at least one product;
   aggregate production information, wherein the production information is associated with production resources of the at least one product;
   aggregate consumer liking information of the at least one product;
   establish objective functions;
   establish constraint functions;
   model consumer liking based on the aggregated consumer liking information of the at least one product;
   calculate a blending plan as a function of the aggregated material information, production information, and modeled consumer liking, and in calculating the blending plan, utilize the objective and constraint functions; and
   provide blending plan information based on the blending plan for controlling the production resources;
   wherein the system optimizing the blending plan receives or sends data on one or more factors selected from the group consisting of: (a) obtaining beverage input supply information; (b) obtaining inventory; (c) obtaining orders from channels; (d) managing inventory; (e) controlling production resources; (f) producing cost data; (g) producing quality data; (h) evaluating multiple alternative raw material and cost scenarios; (i) predicting consumer demand; (j) forecasting inventory; (k) forecasting product availability; (l) forecasting production availability; (m) forecasting brix; and (n) forecasting pulp profile.

2. The system of claim 1, wherein the product input comprises an agricultural commodity.

3. The system of claim 2, wherein the agricultural commodity comprises oranges.

4. The system of claim 1, wherein the material information comprises at least one of brix, acidity, limonin, nomilin, color, mouth-feel, pulp content profile, cost, freight cost, storage cost, and quality.

5. The system of claim 1, wherein the production information comprises at least one of machine availability, vat availability, storage availability; machine turnover time; machine turnover cost, labor information, plant capacity, and machine capacity.

6. The system of claim 1, wherein modeling consumer liking of the at least one product comprises determining a demand distribution based on consumer data comprising at least one of consumer purchase data and consumer survey data.

7. The system of claim 1, wherein the at least one product comprises at least one stock keeping unit.

8. The system according to claim 1, wherein said processor is further configured to solve for at least one variable utilizing a system of linear equations used to describe the objective and constraint functions when calculating the blending plan.

9. A method of optimizing blending comprising:
   aggregating, at a processor, material information for mass production of at least one product, wherein the material information is associated with a product input of at least one product;
   aggregating, by the processor, production information, wherein the production information is associated with production resources of the at least one product;
   aggregating, by the processor, consumer liking information of the at least one product;
   establishing objective functions;
   establishing constraint functions;
   modeling, by the processor, consumer liking based on the aggregated consumer liking information of the at least one product;
   calculating, by the processor, a blending plan as a function of the aggregated material information, production information, and modeled consumer liking, and in calculating the blending plan, utilizing the objective and constraint functions; and
   providing, by the processor, blending plan information based on the blending plan for controlling the production resources;
   wherein optimizing blending comprises receiving or sending data on one or more factors selected from the group consisting of: (a) obtaining beverage input supply information; (b) obtaining inventory; (c) obtaining orders from channels; (d) managing inventory; (e) controlling production resources; (f) producing cost data; (g) producing quality data; (h) evaluating multiple alternative raw material and cost scenarios; (i) predicting consumer demand; (j) forecasting inventory; (k) forecasting product availability; (l) forecasting production availability; (m) forecasting brix; and (n) forecasting pulp profile.

10. The method of claim 9, wherein the material information comprises at least one of brix, acidity, limonin, nomilin, color, mouth-feel, pulp content profile, cost, freight cost, storage cost, and quality.

11. The method of claim 9, wherein the production information comprises at least one of machine availability, vat availability, storage availability; machine turnover time; machine turnover cost, labor information, plant capacity, and machine capacity.

12. The method of claim 9, wherein modeling consumer liking of the at least one product comprises determining a demand distribution based on consumer data comprising at least one of consumer purchase data and consumer survey data.

13. The method of claim 9, wherein the at least one product comprises at least one stock keeping unit.

14. The method of claim 9, wherein the product input comprises an agricultural commodity.

15. An article of manufacture including a tangible computer-readable medium having instructions stored thereon that, if executed by a computing device, cause the computing device to perform operations comprising:

aggregating material information for mass production of at least one product, wherein the material information is associated with a product input of at least one product;

aggregating production information, wherein the production information is associated with production resources of the at least one product;

aggregate consumer liking information of the at least one product;

establishing objective functions;

establishing constraint functions;

modeling consumer liking based on the aggregated consumer liking information of the at least one product;

calculating a blending plan as a function of the aggregated material information, production information, and modeled consumer liking, and in calculating the blending plan, utilizing the objective and constraint functions; and providing blending plan information based on the blending plan for controlling the production resources;

wherein the operations are selected from the group consisting of: (a) obtaining beverage input supply information; (b) obtaining inventory; (c) obtaining orders from channels; (d) managing inventory; (e) controlling production resources; (f) producing cost data; (g) producing quality data; (h) evaluating multiple alternative raw material and cost scenarios; (i) predicting consumer demand; (j) forecasting inventory; (k) forecasting product availability; (l) forecasting production availability; (m) forecasting brix; and (n) forecasting pulp profile.

16. The article of manufacture of claim 15, wherein the material information comprises at least one of brix, acidity, limonin, nomilin, color, mouth-feel, pulp content profile, cost, freight cost, storage cost, and quality.

17. The article of manufacture of claim 15, wherein the production information comprises at least one of machine availability, vat availability, storage availability; machine turnover time; machine turnover cost, labor information, plant capacity, and machine capacity.

18. The article of manufacture of claim 15, wherein modeling consumer liking of the at least one product comprises determining a demand distribution based on consumer data comprising at least one of consumer purchase data and consumer survey data.

19. The article of manufacture of claim 15, wherein the product input comprises an agricultural commodity and the at least one product comprises at least one stock keeping unit.

* * * * *